Figure 4:
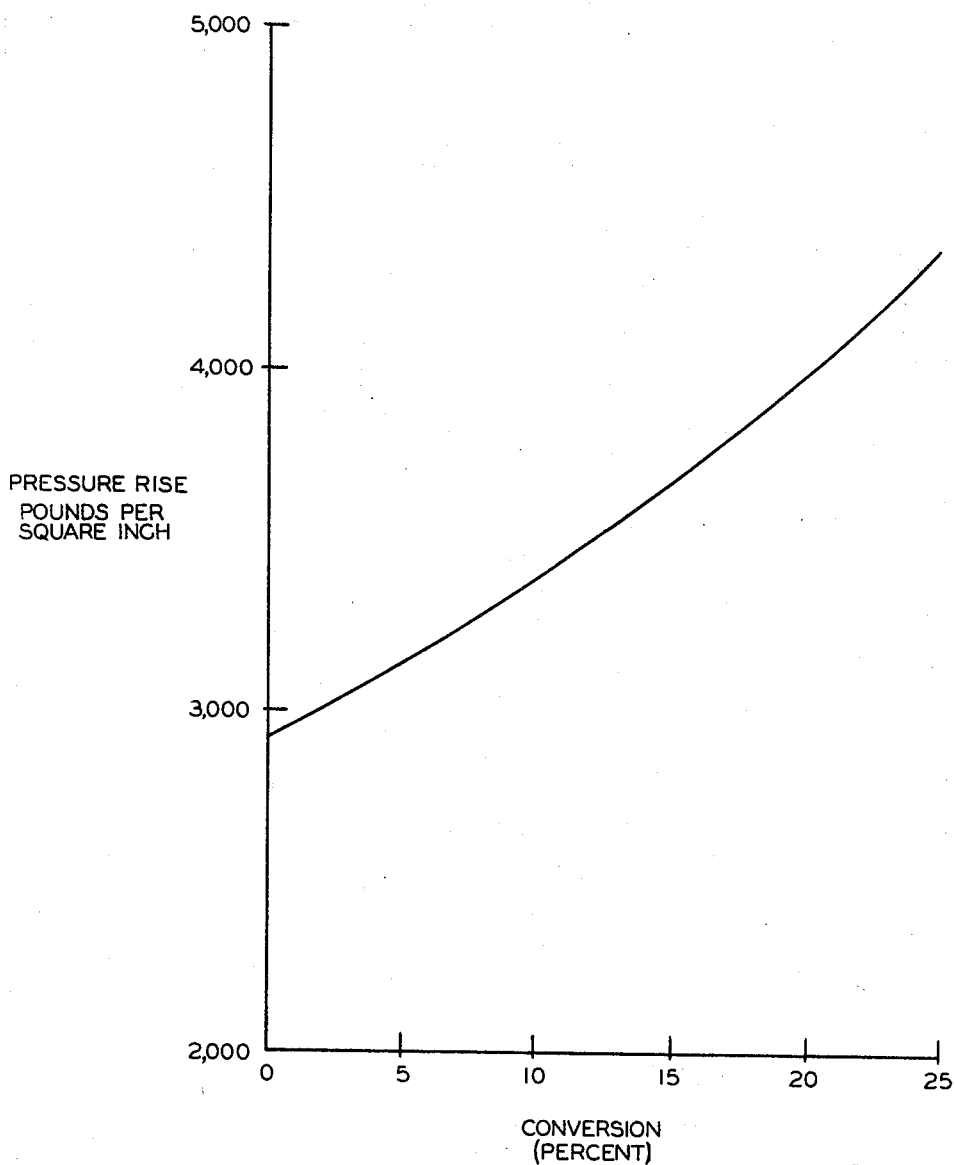

March 28, 1967 D. E. CARTER 3,310,975
CONSTANT VOLUME CONVERSION METER
Filed Oct. 24, 1963 2 Sheets-Sheet 1
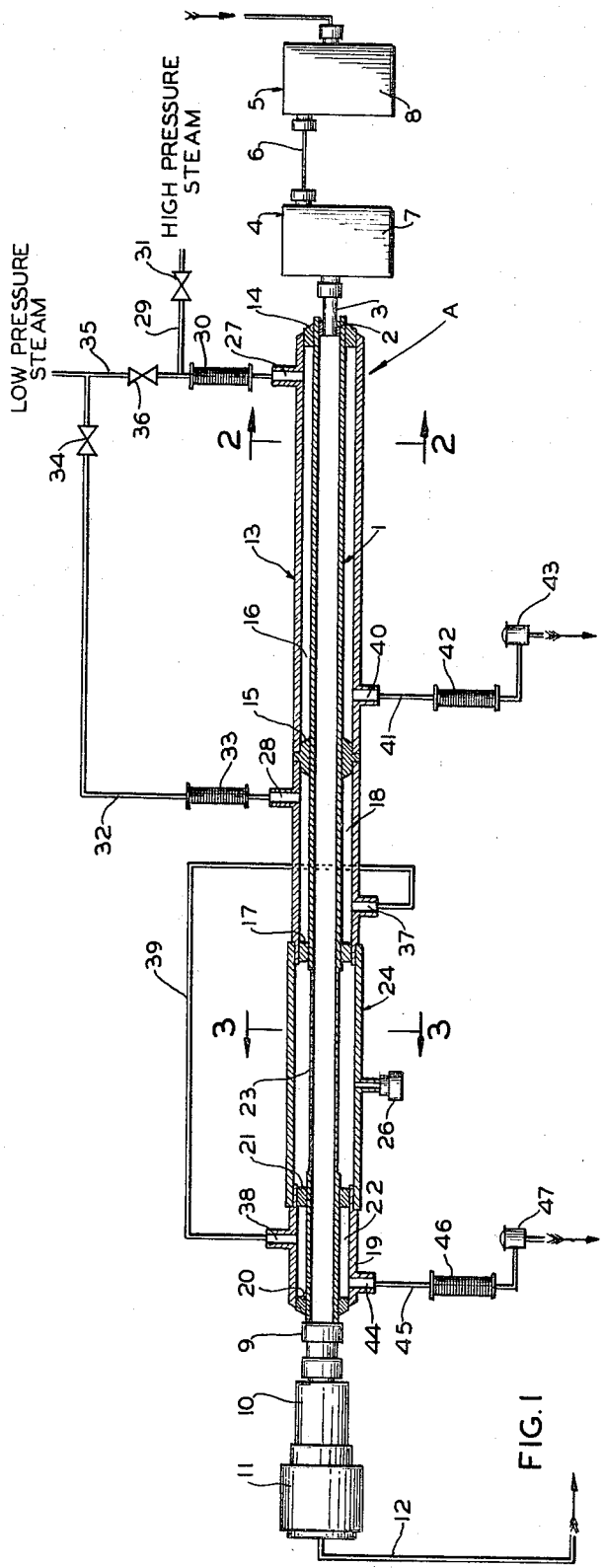
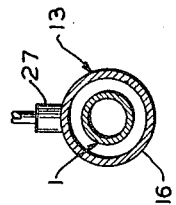
FIG. 2
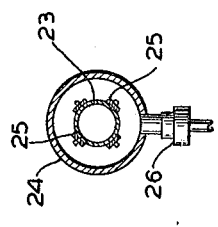
FIG. 3
FIG. 1
INVENTOR.
DON E. CARTER
BY
*Robert J. Schaap*
ATTORNEY INVENTOR.
DON E. CARTER
BY Robert J. Schaap
ATTORNEY United States Patent Office 3,310,975
Patented Mar. 28, 1967

3,310,975
CONSTANT VOLUME CONVERSION METER
Don E. Carter, St. Louis, Mo., assignor to Monsanto Company, a corporation of Delaware
Filed Oct. 24, 1963, Ser. No. 318,647
14 Claims. (Cl. 73—19)

This invention relates in general to constant volume conversion meters, and more particularly, to meters which are capable of measuring the degree of monomer to polymer conversion.

It is well recognized that there has been a long-standing need for an instrument to measure and monitor the conversion of monomer to polymer in polymer manufacturing plants, both in commercial scale and in pilot plant operations. In research and pilot plant operations, such a device would aid in developing quantitative relations between operating conditions and conversion, and thus make it possible to employ unsteady state experimental techniques. In commercial scale plant operations, a polymer conversion meter would enable more efficient operation of the plant. A conversion meter of this type, would apprize the operator of the plant of the degree of conversion being attained and whether or not the plant is operating at optimum productivity. Consequently, through the use of such a meter, the necessary adjustments could be made to insure optimum productivity.

In the manufacture of polyethylene, for example, it is extremely difficult, and often times impossible to determine the degree of monomer conversion taking place within the reactor. Consequently, the operating conditions are often established by a trial and error process. Since the reactor is usually operated in a pressure range of approximately 35,000 lbs. per square inch pressure, the monomer, ethylene is a very dense gas. Moreover, the monomer at these pressure conditions acts as a solvent for the polymer and the polymer is in effect, dissolved in the monomer. Consequently, devices which employ the principle of condensing one of the gases and measuring the volume or pressure change, are not applicable since the gases contained herein do not necessarily condense.

It is therefore the primary object of the present invention to provide a method for measuring the degree of monomer to polymer conversion in a polymer reactor.

It is another object of the present invention to provide an apparatus which is capable of monitoring monomer conversion in a polymer producing system.

It is an additional object of the present invention to provide a method of determining monomer-polymer conversion wherein a simple pressure measurement will provide an indication of the degree of conversion.

It is a further object of the present invention to provide an apparatus of the type stated which is inexpensive to manufacture and can be used with a wide variety of monomer-polymer conversion systems.

It is also an object of the present invention to provide an apparatus of the type stated which is not subject to, or affected by external operating conditions and which is highly accurate in its operation.

With the above and other objects in view, my invention resides in the novel features of form, construction, arrangement, and combination of parts presently described and pointed out.

In the accompanying drawings:

FIGURE 1 is a schematic side elevational view, partially broken away and in section of a conversion meter constructed in accordance with and embodying the present invention;

FIGURES 2 and 3 are horizontal sectional views taken along lines 2—2 and 3—3 respectively of FIGURE 1; and FIGURE 4 is a pressure rise-conversion chart for indicating the percent of ethylene-polyethylene conversion as a function of pressure and which is used in connection with the present invention for determining the degree of conversion.

Generally speaking, the conversion meter of the present invention operates on the principle that at constant volume, the pressure change of a monomer-polymer system, with a change in temperature is related to the relative concentration of monomer and polymer in the system. The effluent from the polymer reactor containing both the polymer and monomer is passed into the conversion meter of the present invention and is adjusted to a selected temperature where the pressure is recorded. The temperature is then reduced and the pressure reduction is again noted. By determining the pressure differential at the selected temperature differential, the amount of polymer present in the effluent of the reactor can be determined from a conversion chart of the type shown in FIGURE 4.

The device and method of the present invention are particularly useful in ethylene-polyethylene systems, where the ethylene is converted to polyethylene under high pressure and temperature. In this particular situation, the ethylene operates as a non-ideal gas, and in the reactor is maintained at approximately 35,000 lbs. per sq. inch pressure. When the ethylene monomer is converted to the polyethylene polymer, the latter becomes a solid material. However, at this pressure the ethylene acts as a solvent for the polyethylene and the polyethylene is, in effect, dissolved in the ethylene from which it is converted.

Referring now in more detail and by reference characters to the drawings which illustrate a preferred embodiment of the present invention, A designates a constant volume conversion meter comprising a relatively long cylindrical sample tube 1 which is provided at its inlet end, that is the right transverse end, reference being made to FIGURE 1, with an adapter sleeve 2. Fitted within the adapter sleeve 2 is a high pressure tube 3, which is connected to an inlet valve 4, and the inlet valve 4 being in turn connected to an inlet valve 5 through a connecting tube 6. The inlet valve 5 is ultimately connected to the effluent side of a polyethylene reactor (not shown). The valves 4 and 5 are further provided with conventional steam jackets, 7—8, in order to prevent cooling of the fluid constituents contained in the effluent stream.

Secured to the outlet end of the sample tube 1, reference being made to FIGURE 1, is a pipe fitting 9 and threadedly secured thereto is a pneumatically operated outlet valve 10, which is similarly provided with a steam jacket 11. The valve 10 is also conventionally provided with a vent 12.

A steam jacket 13 is concentrically disposed around and extends axially along the sample tube 1, for the greater portion of its length. The steam jacket 13 is diametrally larger than the sample tube 1 and at its right transverse end is provided with an annular steam seal 14. The sample tube 1 has an overall length of approximately 5 ft. and spaced at a point approximately 4 ft. from the seal 14 is a second chamber-forming seal 15 which snugly engages the exterior wall of the sample tube 1 and the interior wall of the steam jacket 13 and thereby forms a high pressure steam chamber 16. Spaced axially from the chamber-forming seal 15 at a point approximately ⅓-ft. therefrom, is a chamber-forming seal 17 which is interposed between the steam jacket 13 and the sample tube 1 and thereby forms a low pressure steam chamber 18.

Concentrically disposed about the sample tube 1 and extending axially therealong, near the left transverse end of the tube 1 is a relatively short steam jacket 19 having an overall length of approximately ⅓-ft., and which is sealed at its left transverse end by an end seal 20. Spaced axially from the end seal 20 is a chamber-forming seal 21, which is interposed between the steam jacket 19 and the sample tube 1 and thereby forms a low pressure steam chamber 22.

Interposed between the chamber-forming seals 17, 21 is a strain gauge assembly 23 which consists of a longitudinal "split-copper" tube housing 24, and which is secured to the terminal margins of each of the jackets 18, 19, and extend over the annular surfaces of each of the seals 17, 21. The strain gauge assembly 23 also comprises four annularly spaced strain gauge plates 25, which are welded or otherwise rigidly secured to the exterior surface of the sample tube 1 in the area between the seals 17, 21. The four strain gauge plates 25 constitute a bridge which is capable of sensing pressure changes on the sample tube 1 and these pressure changes are transmitted through electrical leads connected to the plates 25 and to a junction box 26 which is secured to the tube housing 24 and is ultimately connected to a direct pressure readout (not shown). The remainder of the strain gauge 23 is conventional in its construction, and therefore is not described in detail herein. However, it should be pointed out that the strain gauge 23 can conventionally be provided with electrical leads (not shown) for connection to a suitable recorder which will record the pressure differentials over selected time intervals It should also be understood that other types of pressure measuring devices, such as a "Bourdon Tube Gage," could be employed in place of the strain gage assembly 23. However, for the purposes of the present invention, the strain gage assembly 23 has been found to be most suitable.

The steam jacket is provided with a pair of inlet ports 27, 28, the former of which communicates with the high pressure steam chamber 16 and the latter communicating with the low pressure steam chamber 18. Connected to the port 27 is a high pressure steam line 29 and interposed in the steam line 29 is a conventional steam saturator 30 and a manually operable control valve 31. The high pressure steam line 29 is ultimately connected to a suitable source of high pressure steam (not shown) which is capable of providing steam at 556 lbs. per square inch gauge (250° C.). Connected to the inlet port 28 is a low pressure steam line 32, which is provided with a conventional steam saturator 33 and a manually operable control valve 34. The low pressure steam line 32 is ultimately connected to a source of low pressure steam (not shown) which is capable of providing steam at 210 lbs. per square inch gauge (200° C.). Interconnecting the low pressure steam line 32 and the high pressure steam line 29 is a by-pass line 35, which is also provided with a manually operable control valve 36 so that it is possible to provide low pressure steam to the chamber 16, by proper operation of the valves 34, 36. The steam jacket 13 is also integrally provided with a discharge port 37, which communicates with the low pressure steam chamber 18 and the steam jacket 19 is integrally provided with an inlet port 38 communicating with the chamber 22. The ports 37, 38 are connected by a steam supply tube 39, which provides the low pressure steam to the low pressure steam chamber 22.

The steam jacket 13 is further integrally provided with a discharge port 40 communicating with the high pressure chamber 16, and connected to the discharge port 40 is a discharge line 41, which is preferably provided with a radiator 42 and a steam trap 43 for ultimate discharge of the high pressure steam from the chamber 16. Similarly, the steam jacket 19 is integrally provided with a discharge port 44 and connected thereto is a discharge line 45 which is preferably provided with a radiator 46 and a steam trap 47 for discharging the low pressure steam from the chambers 18 and 22.

In use, the constant volume conversion meter A is connected to the effluent or discharge side of a polyethylene reactor, through the inlet valves 4 and 5. The valves 4, 5 are open so that a charge of the effluent from the reactor will pass into the sample tube 1. After a charge of material from the reactor has been admitted to the sample tube 1, the inlet valves 4, 5 are closed. Inasmuch as the polyethylene reactor does not convert 100% of the monomer to polymer, the effluent will contain a percentage of the polyethylene in solution in the gaseous ethylene monomer. It should be understood in this connection, that the effluent from the reactor can be passed into a surge tank for preconditioning the charge, prior to entry into the sample tube 1.

The valve 31 is maintained in the closed position, and the valves 34, 36 are opened for admitting low pressure steam to the steam chamber 16 and the steam chamber 18. Steam from the chamber 18 will pass through the steam supply tube 39 into the chamber 22. The application of the steam at 200° C. will heat the charge of material contained within the sample tube 1 thereby maintaining the charge at some particular pressure which can be conveniently noted on the gauge 26. The steam condensate from the chamber 16 will drain through the port 40 and the discharge line 41. The steam condensate contained within the chambers 18 and 22 will drain through the discharge port 44 and discharge line 45 communicating with the steam chamber 22. Thereafter, the valves 34, 35 are closed and the valve 31 is opened thereby admitting high pressure steam at 250° C. to the high pressure steam chamber 16. The increased temperature on the wall of the sample tube 1 will create a temperature increase which will create a pressure increase in the gaseous reactants or the charge contained within the tube 1, which change will be sensed by the strain gauge plates 25 and recorded on the gauge 26. It can be seen, by reference to FIGURE 1, that the strain gauge 23 is never contacted by, or in close proximity to, the high pressure steam from the high pressure steam source, since it is in effect insulated from the high pressure steam chamber 16 by the low pressure steam chamber 18. This design is necessary in the present invention since the high temperature of the high pressure steam would affect the calibration of the strain gauge 23.

The volume of the monomer constituent, namely ethylene, is a function of the pressure and the temperature and similarly, the volume of the polymer constituent, namely polyethylene, is also a function of the pressure and the temperature. Accordingly, the volume of a mixture of the monomer and polymer constituents is also a function of the pressure and temperature. Therefore, it can be seen that change in pressure for a particular change in temperature is a function of the percentage of polymer to monomer, and in this case, indicates the percentage of polymer to monomer in the effluent or the degree of conversion obtained in the reactor. The thermodynamic chart of FIGURE 4 is a plot of the degree of conversion as a function of pressure change for a given temperature differential, of 50° C. Of course, similar charts for other selected temperature differentials could be constructed in order to obtain the degree of conversion as a function of the pressure change. Thus, when the pressure indicated by the strain gauge 23 at a temperature of 200° C. is noted and the pressure recorded on the strain gauge 23 at a temperature of 250° C. maintained on the sample tube 1, is noted, the pressure differential can be computed for the 50° C. temperature change. From this temperature differential, the degree of polyethylene contained within the ethylene, which in effect measures the degree of conversion, can be found in FIGURE 4. For example, if a 3,200 lb. per square inch pressure change were observed for the 50° temperature change, the degree of conversion obtained would be 11% as indicated in FIGURE 4.

To construct the thermodynamic chart of FIGURE 4, the plot of Pressure Rise versus Conversion, use is made of standard thermodynamic data and the following equations of state for this polymer-monomer system:

$$v_m = w_m f_m(P, T) \quad (1)$$

$$v_p = w_p f_p(P, T) \quad (2)$$

where $v_m$ = volume of tube occupied by monomer (ft.$^3$)
$v_p$ = volume of tube occupied by polymer (ft.$^3$)
$w_m$ = weight of monomer in tube (lb.)
$w_p$ = weight of polymer in tube (lb.)
$P$ = pressure in tube (p.s.i.g.)
$T$ = temperature in tube (° C.)

Since the volume of the tube is constant for any pressure and temperature the following relation holds:

$$V = v_m + v_p = w_m f_m(P, T) + w_p f_p(P, T) \quad (3)$$

The concentration of polymers (conversion) $Cp$ can therefore be expressed by the following relationship:

$$Cp = \left(\frac{w_p}{w_m + w_p}\right)(100) \quad (4)$$

To determine a point on the pressure rise curve of FIGURE 4, a value of conversion $Cp$ is chosen and, using Equations 3 and 4, $w_m$ and $w_p$ are calculated for the initial temperature T, at pressure $P_1$. Next the final pressure $P_2$ corresponding to the final temperature $T_2$ is calculated from Equation 3 by a trial and error process. The pressure rise $\Delta P$ plotted as the ordinate on FIGURE 4 corresponding to the chosen pressure is the difference $$\Delta P = P_2 - P_1 \quad (5)$$

where $P_2$ is the pressure at the higher temperature
$P_1$ is the pressure at the lower temperature It should be noted that pressure rise calculated as described above is only approximate, inasmuch as $v_m$ and $v_p$ are independent of polymer concentration. The above described method for plotting the thermodynamic chart of FIGURE 4 does, however, neglect the thermodynamic effects of solution, such as the heat of solution. Therefore, for any given system some correction of FIGURE 4 obtained by making measurements on mixtures of known compositions is required. The conversion meter of the present invention would be connected to a suitable polymerization reactor and various conversion tests would be made with effluents containing known quantities of polymer. In this case, various effluents containing selected amounts of polymer would be tested in the conversion meter A to determine the accuracy of points plotted for a percent of conversion as a function of pressure and any deviation existing would be corrected.

It should also be understood that the above device will operate with any monomer-polymer conversion system. However, the device and the method of the present invention are most suitable for indicating conversion when the monomer is maintained in a gaseous state at high pressure and acts as a solute for the polymer so that the polymer is, in effect, dissolved in the monomer. Often times, a propane modifier is contained within the reactor feed. The propane modifier included in the charge to the sample tube 1 would not affect the results thus obtained when computing the degree of conversion. However, it would change the amount of conversion by a constant factor and this factor can be determined experimentally and included when constructing the conversion charts.

The saturators 30, 33 on each of the steam lines 29, 32 respectively, insure the fact that low-quality steam that is saturated steam or steam of a quality less than 95% is admitted into the steam chambers 16, 18 and 22. Moreover, the steam lines 29, 32 are preferably uninsulated at the points of attachment to the ports 27, 28 respectively thereby providing low-quality steam. The use of low-quality steam insures good temperature control within the steam chambers 16, 18 and 23.

The invention is further illustrated by, but not limited to, the following examples.

EXAMPLE 1

A constant volume conversion meter substantially similar to the device of FIGURE 1 was vertically mounted with the inlet valves at the upper end and ultimately connected to the downstream side of a tubular ethylene polymerization reactor. The constant volume conversion meter had a sample tube length of 5 ft. and an inner diameter of 5/16-inch. The upper steam jacket had a length of 4 ft.

Prior to the operation of the ethylene polymerization reactor, the reactor and the constant volume conversion meter were purged of air by opening the inlet valves and the outlet valve on the sample tube. Ethylene was then passed into the sample tube for approximately five minutes and the lower and upper valves on the conversion meter were closed, while maintaining the sample chamber with ethylene at atmospheric pressure. After the ethylene reactor had been operated for approximately one-half hour, a sample was withdrawn therefrom and admitted to the constant volume conversion meter. Both of the inlet valves and the outlet valve were opened until a sufficient quantity of the reacted ethylene had passed through the sample tube. Thereafter, the outlet valve was closed and this was followed by the closing of both of the inlet valves. Low quality steam at 210 lbs. per square inch gauge was admitted to the upper and lower steam jackets and after five minutes, the pressure in the sample chamber became steady at 30,000 lbs. per square inch gauge. Thereafter, low quality steam at 556 lbs. per square inch gauge was admitted to the upper steam jacket and after five minutes, the pressure in the sample tube had risen to 33,660 lbs. per square inch gauge.

The temperature of the steam at 210 lbs. per square inch and 556 lbs. per square inch is 200° and 250° C. respectively. By comparing the measured pressure differential of 3,660 with the temperature differential of 50° C. in the conversion chart of FIGURE 4, it can be seen that the sample charge in the conversion meter contained 15% polyethylene.

EXAMPLE 2

A sample was drawn from the polyethylene reactor after two hours of operation and the procedure of Example 1 was reperformed. The initial and final pressures were measured at 30,000 lbs. per square inch gauge and 34,000 lbs. per square inch gauge respectively, giving a pressure differential of 4,000 lbs. per square inch. Comparing this 4,000 lb. per square inch differential with the 50° temperature differential on the thermodynamic chart of FIGURE 4, indicated 20.7% polyethylene in the mixture.

It should be understood that changes and modifications can be made in the form, construction, and arrangement of parts presently described and pointed out without departing from the nature and principle of invention.

Having thus described my invention, what I desire to claim and secure by Letters Patent is:

1. The method of measuring the amount of a solid in admixture with a gas which is maintained above its critical temperature to prevent condensation thereof, said method comprising trapping a sample of said mixture and maintaining said sample in a constant volume media, causing a temperature change across the sample while maintaining the gas in the mixture above its critical temperature, measuring the pressure change resulting from the temperature change, and correlating the pressure change for the given temperature differential with a percentage of one of the components of the sample from standard equation of state data.

2. The method of measuring the amount of a solid solute contained in a gas which is maintained above its critical temperature to prevent condensation thereof, said method comprising trapping a sample of said mixture, and maintaining said sample in a constant volume media, causing a temperature change across the sample while maintaining the gas in the mixture above its critical temperature, measuring the pressure change resulting from the temperature change, and correlating the pressure change for the given temperature differential with a percentage of the non-condensable gas solute from standard equation of state data.

3. The method of measuring the degree of conversion of monomer to polymer in a polymer producing process, wherein the monomer is maintained in a non-ideal gas state condition, said method comprising trapping a sample of monomer and polymer contained in the effluent of said process and maintaining said sample in a constant volume media, causing a temperature change across the sample while maintaining the monomer in the mixture above its critical temperature, measuring the pressure change resulting from the temperature change, and correlating the pressure change for the given temperature differential with a percentage of one of the components of the sample from standard equation of state data.

4. The method of measuring the degree of conversion of polymer to monomer in a polymer producing process, wherein the monomer is maintained in a non-ideal gas state condition, said method comprising trapping a sample of monomer and polymer contained in the effluent of said process and maintaining said sample in a constant volume media, causing a temperature change across the sample while maintaining the monomer in the mixture above its critical temperature, measuring the pressure change resulting from the temperature change, establishing a curve characteristic of percent of one of the components present in the effluent as a function of pressure differential for a given temperature differential, and determining the percent of said last named component present from said curve with the pressure differential thus measured.

5. The method of measuring the degree of conversion of polymer to monomer in a polymer producing process, wherein the monomer is maintained in a non-ideal gas state condition, said method comprising trapping a sample of the monomer and polymer contained in the effluent of said process and maintaining said sample in a constant volume media, bringing the sample in said constant volume media to a first temperature and recording the pressure at said temperature, bringing the sample in said constant volume media to a second temperature, thereby causing a selected temperature differential, selecting each of said first and second temperatures so that the monomer is maintained above its critical temperature, and recording the pressure at said second temperature thereby determining a pressure differential for the selected temperature differential.

6. The method of measuring the degree of conversion of polymer to monomer in a polymer producing process, wherein the monomer is maintained in a non-ideal gas state condition and the polymer is a solid which is dissolved in the monomer, said method comprising trapping a sample of the monomer and polymer contained in the effluent of said process and maintaining said sample in a constant volume media, bringing the sample in said constant volume media to a first temperature and recording the pressure at said temperature, bringing the sample in said constant volume media to a second temperature, thereby causing a selected temperature differential, selecting each of said first and second temperatures so that the monomer is maintained above its critical temperature, and recording the pressure at said second temperature thereby determining a pressure differential for the selected temperature differential.

7. The method of claim 1 wherein the polymer is polyethylene, the monomer is ethylene and the first and second temperatures are 200° C. and 250° C. respectively.

8. A device for quantitatively measuring the degree of monomer to polymer conversion in a polymer producing system, wherein a charge containing the monomer and polymer is drawn from the effluent of the polymer producing system and the monomer is a non-ideal gas, said device comprising a tubular sampling chamber having inlet and outlet ports, valve means on said inlet and outlet ports, three axially spaced heating devices surrounding said sampling chamber, one of said heating devices being operable at a first temperature, the other two heating devices being operable at a second temperature which is appreciably different from said first temperature, and pressure sensitive means interposed between the two heating devices operable at said second temperature and being operatively mounted on said chamber for indicating the pressure within the chamber at various temperatures thereof.

9. A device for quantitatively measuring the degree of monomer to polymer conversion in a polymer producing system, wherein a charge containing the monomer and polymer is drawn from the effluent of the polymer producing system and the monomer is a non-ideal gas, said device comprising a tubular sampling chamber having inlet and outlet ports, valve means on said inlet and outlet ports, a high temperature heating means surrounding said sampling chamber, a first low temperature heating means surrounding said chamber and being axially aligned with said high temperature heating means, a second low temperature heating means surrounding said chamber and being axially spaced from said first low temperature heating means, each of said heating means being adapted to maintain the charge within the chamber at a temperature above the critical temperature of the monomer, and pressure sensitive means interposed between said first and second low temperature heating means and being operatively mounted on said chamber for indicating the pressure within the chamber at various temperatures thereof.

10. A device for quantitatively measuring the degree of monomer to polymer conversion in a polymer producing system, wherein a charge containing the monomer and polymer is drawn from the effluent of the polymer producing system and the monomer is a non-ideal gas, said device comprising a tubular sampling chamber having inlet and outlet ports, valve means on said inlet and outlet ports, a high temperature heating means surrounding said sampling chamber, a first low temperature heating means surrounding said chamber and being axially aligned with said high temperature heating means, a second low temperature heating means surrounding said chamber and being axially spaced from said first low temperature heating means, each of said heating means being adapted to maintain the charge within the chamber at a temperature above the critical temperature of the monomer, said high temperature heating means having a total heating surface which is substantially longer than the total heating surface of said first and second low temperature heating means, and pressure sensitive means interposed between said first and second low temperature heating devices and being operatively mounted on said chamber for indicating the pressure within the chamber at various temperatures thereof.

11. A device for quantitatively measuring the degree of monomer to polymer conversion in a polymer producing system, wherein a charge containing the monomer and polymer is drawn from the effluent of the polymer producing system and the monomer is a non-ideal gas, said device comprising a tubular sampling chamber having inlet and outlet ports, valve means on said inlet and outlet ports, a first heating means surrounding said sampling chamber, a second heating means surrounding said chamber and being axially aligned with said first heating means, a third heating means surrounding said chamber and being axially spaced from said second heating means, each of said heating means being adapted to maintain the charge within the chamber at a temperature above the critical temperature of the monomer, means associated with said first heating means for selectively causing low and high temperatures thereof, means associated with said second and third heating means for causing low temperatures thereof, and pressure sensitive means interposed between said second and third heating devices and being operatively mounted on said chamber for indicating the pressure within the chamber at various temperatures thereof.

12. A device for quantitatively measuring the degree of monomer to polymer conversion in a polymer producing system wherein a charge containing the monomer and polymer is drawn from the effluent of the polymer producing system and the monomer is a non-ideal gas, said device comprising a tubular sampling chamber having inlet and outlet ports, valve means on said inlet and outlet ports, a first heating means surrounding said sampling chamber, a second heating means surrounding said chamber and being axially aligned with said first heating means, a third heating means surrounding said chamber and being axially spaced from said second heating means, each of said heating means being adapted to maintain the charge within the chamber at a temperature above the critical temperature of the monomer, means associated with said first heating means for selectively causing low and high temperatures thereof, means associated with said second and third heating means for causing low temperatures thereof, said first heating means having a heating surface which is substantially greater than the total heating surface of said second and third heating means, and pressure sensitive means interposed between said second and third heating means and being operatively mounted on said chamber for indicating the pressure within the chamber at various temperatures thereof.

13. The method of measuring the degree of conversion of polymer to monomer in a polymer producing process, wherein the monomer is maintained in a non-ideal gas state condition and the polymer is a solid which is dissolved in the monomer, said method comprising trapping a sample of the monomer and polymer contained in the effluent of said process and maintaining said sample in a constant volume media, bringing the sample in said constant volume media to a first temperature and recording the pressure at said temperature, bringing the sample in said constant media to a second temperature, thereby causing a selected temperature differential, forming a relationship of pressure differential as a function of the degree of conversion for the above method by establishing the volume occupied by each the monomer and the polymer in the constant volume media from thermodynamic data, selecting a value of conversion at a first measured pressure and temperature for components in the constant volume media, calculating the weight of each of the monomer and polymer in the constant volume media according to the following relationships:

$$V = v_m + v_p = w_m f_m(P, T) + w_p f_p(P, T)$$

and $$Cp = \left(\frac{w_p}{w_m + w_p}\right)(100)$$

wherein:

$v_m$ = volume of tube occupied by monomer (ft.³)
$v_p$ = volume of tube occupied by polymer (ft.³)
$w_m$ = weight of monomer in tube (lb.)
$w_p$ = weight of polymer in tube (lb.)
$P$ = pressure in tube (p.s.i.g.)
$T$ = temperature in tube (° C.)
$Cp$ = concentration of polymers (conversion)

calculating a final pressure corresponding to a final temperature in the constant volume media, correlating the pressure change corresponding to the selected pressure as a function of the degree of conversion, and determining the degree of conversion of the sample trapped in the constant volume media based upon the correlation thus established by knowing the pressure differential as a function of the temperature differential in the constant volume media.

14. A device for quantitatively measuring the amount of solid in admixture with a gas which is maintained above its critical temperature to prevent condensation thereof, said device comprising a sampling chamber having inlet and outlet ports, valve means on said inlet and outlet ports, a high temperature heating means surrounding said sampling chamber, a first low temperature heating means surrounding said chamber and being axially aligned with said high temperature heating means, a second low temperature heating means surrounding said chamber and being axially spaced from said first low temperature heating means, each of said heating means being adapted to maintain the charge within the chamber at a temperature above the critical temperature of the gas, and pressure sensitive means interposed between said first and second low temperature heating means and being operatively mounted on said chamber for indicating the pressure within the chamber at various temperatures thereof.

References Cited by the Examiner

UNITED STATES PATENTS

| 2,591,084 | 4/1952 | Martin | 73—28 X |
| 2,643,541 | 6/1953 | McCreary | 73—28 X |
| 2,855,268 | 10/1958 | Coins et al. | 73—28 X |
| 2,870,628 | 1/1959 | Donaldson et al. | 73—23 X |

FOREIGN PATENTS

| 774,284 | 5/1957 | Great Britain. |

RICHARD C. QUEISSER, *Primary Examiner.*

J. C. GOLDSTEIN, *Assistant Examiner.*